Nov. 4, 1924.
R. W. GUNN ET AL
1,513,985
BALL VALVE
Filed March 18, 1922
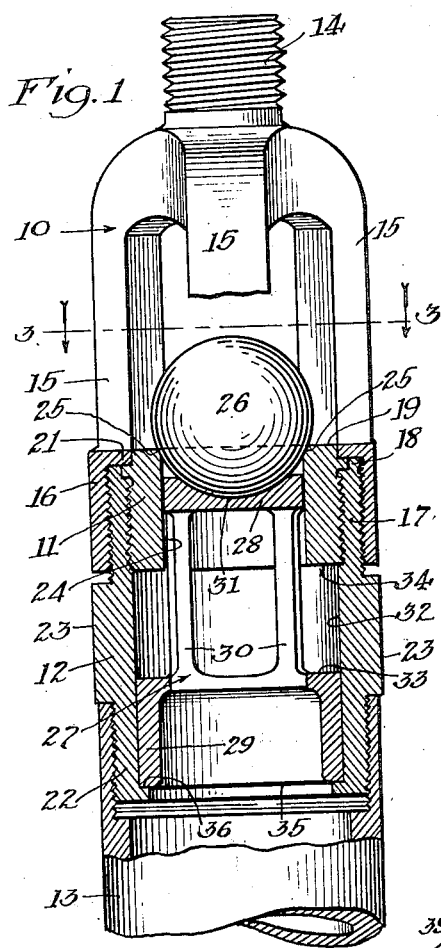
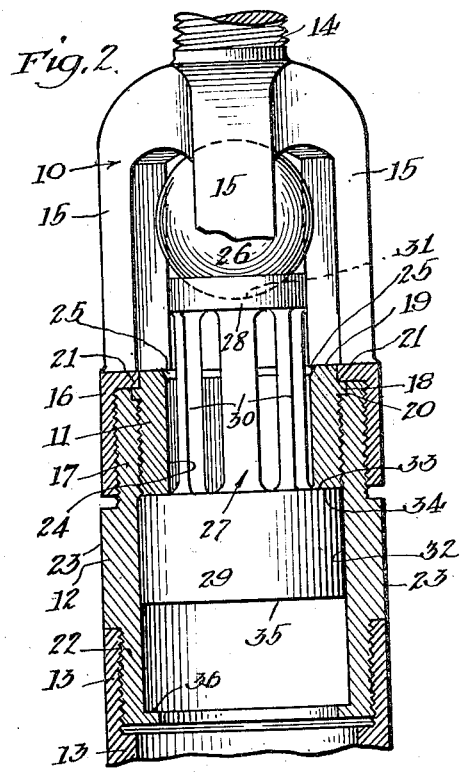
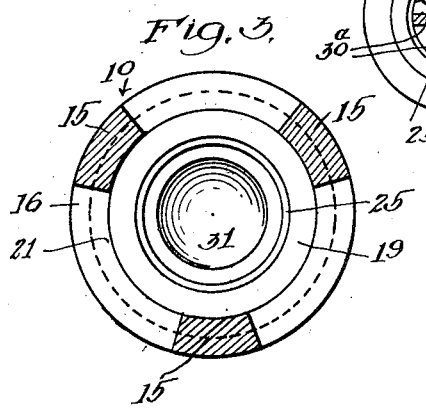
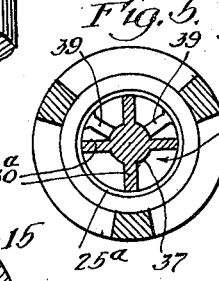
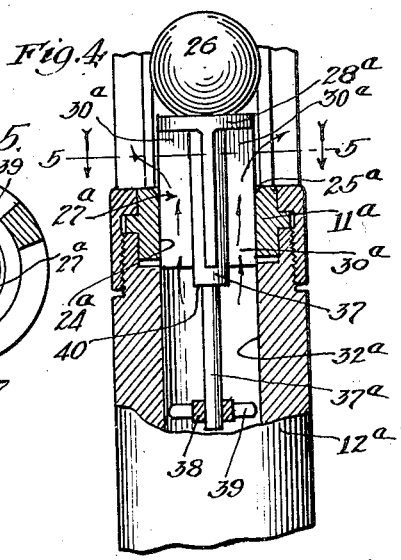
Inventor;
Robert W Gunn
Willsie A. S. Thompson,
By James T Barkeley
his Attorney Patented Nov. 4, 1924.

1,513,985

UNITED STATES PATENT OFFICE.

ROBERT W. GUNN AND WILLSIE A. S. THOMPSON, OF LOS ANGELES, CALIFORNIA.

BALL VALVE.

Application filed March 18, 1922. Serial No. 544,817.

*To all whom it may concern:*

Be it known that we, ROBERT W. GUNN and WILLSIE A. S. THOMPSON, citizens of the United States, and residents of the city of Los Angeles, county of Los Angeles, and State of California, have jointly invented new and useful Improvements in Ball Valves, of which the following is a full, clear, and exact disclosure.

Our invention—which we will hereinafter describe in detail—relates generally to pump valves, and particularly to ball valves of the type commonly used in connection with oil well pumping apparatus and the like. Specifically it pertains to a ball guide, designed to conduce to quick and accurate seating of the ball; the express object of which is to minimize cutting out of the ball seat by sand and grit, resulting from slow and uneven seating of the ball at the beginning of the upstroke of the plunger.

In addition to its functioning as a ball guide, our improvement is designed to also take up some of the valvular work by closing the valve passage to a certain extent, and thereby minimizing possibility of the ball being held off its seat during its closing time, due to high velocity of the oil escaping back into the tubing.

The merits of the invention will be more fully ascertained from the following specification, reference being made therein to the accompanying drawings, in which—

Fig. 1 is a transverse vertical section through the center of a typical ball valve, parts being shown in elevation and showing the application of our invention thereto; Fig. 2 is a view similar to Fig. 1 only showing the ball guide in side elevation; Fig. 3 is a sectional plan view, taken as indicated by the line 3—3 on Fig. 1; Fig. 4 is a fragmentary sectional view, similar to Figs. 1 and 2, only showing a slightly different type of ball guide; and Fig. 5 is a sectional plan view, taken as indicated by the line 5—5 on Fig. 4.

Referring now to the drawings, and particularly to Figs. 1 and 2, we have illustrated a typical ball valve assembly, commonly used in oil well pumping apparatus, consisting of a three wing upper cage 10, a ball seat 11, a plunger bushing 12, and a fragmentary portion of the upper end of a plunger 13.

The cage 10, being an upper cage, has the usual externally screw threaded pin 14, for its attachment to the lower end of a sucker rod; and three wings 15, integrally joined at their lower ends to an internally screw threaded sleeve portion 16; the latter adapted to screw threadedly receive the externally screw threaded upper end 17 of the plunger bushing 12. This upper end 17, of the plunger bushing 12, is also internally screw threaded for the screw threaded reception of the annular ball seat 11, which is likewise externally screwthreaded for the purpose. In order that it may be immovably locked in place the ball seat 11 has an annular rib 18 around its periphery, spaced a short distance down from its top face 19; and this rib fits snugly in an annular recess 20 cut in the inner upper edge of the plunger bushing 12. The cage sleeve 16 has a shoulder 21 adapted to engage the rib 18 when the valve seat 11 is in place to hold it against working loose.

The top end of the plunger 13 is internally screw threaded for engagement with the externally screw threaded lower end 22, of the plunger bushing 12. The plunger bushing 12 is of the usual construction, having flattened surfaces 23 intermediate its ends, for the reception of a suitable wrench, by means of which it is screw threadedly connected with the plunger and ball cage.

The ball seat 11 is of the usual type of construction, being annular and having an axial cylindrical bore 24, through which the oil passes; and having its upper inner edge beveled—as at 25—to form a ground seat for the reception of a steel ball 26, in the manner illustrated in Fig. 6.

Under ordinary conditions during reciprocation of this valve in the working barrel, the ball 26 is raised from the seat 25 by the upward pressure of the oil during its downward stroke, and again seated by the weight of this oil at the beginning of its upward stroke. As will be observed the annular seat 25 is situated concentrically of the wings 15; and the ball 26 is of a size to permit its lateral movement out of axial alignment with the seat 25 when it is raised therefrom. This is to obviate possibility of the ball becoming wedged within the wings 15 by sand or rocks, preventing it from again properly seating during its upward stroke. This permitted looseness of the ball within the cage, by reason of its size, commonly results in its improper seating at the beginning of the upward stroke, so that when the pressure or weight of the oil causes it to drop down on the seat 25 it generally strikes it off center resulting in the chipping and breaking away of the seat surface 25. Also when the ball improperly seats or strikes the seat off center the velocity of the oil rushing back through the bore 24, between the seat surface 25 and that portion of the perimeter of the ball which is unseated, results in cutting away of the seat surface 25 by the sand or grit in the oil. Thus certain portions of the seat surface 25 begin to wear and this wear is increased by a concentrated pencil of oil continuing to pass over that certain spot. It is therefore the foremost object of our invention, to properly guide the ball to its seat and avoid this tendency of its striking the seat off center; preventing chipping of the seat, and avoiding, as far as possible, any concentrated wear of the seat at any particular point.

That form of our invention which we have illustrated in Figs. 1 and 2, comprises a ball guide—generally designated by the numeral 27—having an upper ball carrying table 28 and a lower guide sleeve 29 connected by a plurality of integral longitudinally extending ribs 30. The table 28 may be of any desired thickness, being circular or disk-like to slide axially in the bore 24; and having a concaved recess 31 in its top face, in which the ball 26 will seat. The recess 31 will conform to the perimeter of the ball and is for the purpose of providing a suitable seat for it, which will prevent its rolling off, when it is carried above the seat 25. The table 28 fits sufficiently tight in the bore 24 to properly guide it and prevent binding, and at the same time permits such freedom of movement that it may be easily raised by the oil pressure during its downward stroke.

The guide sleeve 29 likewise fits comparatively loosely in the bore 32, of the bushing 12, to permit it to slide freely therein; the peripheral diameter of this portion being slightly greater than the peripheral diameter of the table 28, so that the shoulder formed by its top edge 33 will engage the bottom end 34 of the ball seat and limit its upward movement. The ribs 30, which are preferably formed integral with the table 28 and guide sleeve 29, are so formed and positioned that their outer edges form sliding guide bearings in the bore 24 to guide the upper end of this member when the table 28 is raised, as illustrated in Fig. 2. The lengths of the ribs 30 are such that when the shoulder 33 is in engagement with the lower ball seat end 34 the table 28 will be raised clear of the upper end 19 (as shown in Fig. 2) so that oil may pass upwardly through the guide sleeve 29 and outwardly over the edge 19 between the ribs.

It will be noted that when the ball guide moves upwardly to the position shown in Fig. 2, the ball 26 will be carried by the table 28 (resting in the seat 31) and the engagement of the ball with the upper end of the cage may also serve to limit the upward movement of the guide without depending upon engagement of the shoulder 33 with the lower seat end 34.

From the foregoing description it is obvious how the oil within the working barrel of the pump will raise the guide 27, by impinging against the under surface of the table 28 during downward movement of the valve, from the position shown in Fig. 1 to that shown in Fig. 2. And it is also clear how the guide 27 will raise the ball 26 off its seat 25 and carry it upwardly while resting in the seat 31. Also as quickly as the cage moves upwardly the weight of the oil on top of the ball and table and the suction below will cause the guide member 27 to move downwardly in the bores 24 and 32, as hereinbefore described, where it will be stopped by the bottom edge 35, of the guide seat 29, engaging an annular shoulder 36 formed in the lower end of the bushing 12. As the table 28 moves downwardly in the bore 24, the ball 26 will be accurately and centrally seated in the annular seat 25 (as shown in Fig. 1) the guide moving down sufficiently far for the table 28 to leave the ball 26 thus seated and so that seat 31 will be spaced slightly from the perimeter of the ball when thus seated. This obviates possibility of the ball being held off its seat by the guide 27.

As the guide moves down in the bores 24 and 32, the table 28 on passing the top edge 19 of the seat 11, will first cut off return passage of the oil through the bore 24, so that when the ball 26 is left in the seat 25 by downward movement of the guide, it not only will be accurately and centrally seated, but there will be no side pressure created by high velocity of oil passing between the seat 25 and the perimeter of the ball to hold it off its seat or to cause any concentrated wear of the seat, as previously described. Also, this carrying upwardly and seating in the ball by the guide prevents mutilation of the ball by its striking the top of the cage or its being forcibly seated.

In the form of construction illustrated in Figs. 4 and 5, the table 28ª is carried upon a central pin 37, which pin is reduced at its lower end, as at 37ª, and extends through a guide bearing 38 in a spider 39; the latter formed integral with the plunger bushing 12ª. The shoulder 40 formed between the pins 37 and 37ª engages the top face of the bearing 38 to limit the downward movement of the guide in this form of construction. A plurality of guide ribs 30ª, preferably formed integral with the table 28ª and the pin 37, extend outwardly from the latter in a cruciform configuration (see Fig. 5), their outer edges forming sliding guide bearings in bore 24$^a$ of the ball seat 11$^a$. With this type of construction the upward movement of the guide 27$^a$ is limited by the ball 26 engaging the top of the cage, as hereinbefore described. Therefore, the length of the guide ribs 30$^a$ will be such that when the ball 26 carried by the table 28$^a$ is in engagement with the top of the cage, these ribs will be in engagement at their lower ends with the perimeter of the bore 24$^a$, as illustrated in Fig. 4. Thus the ribs 30$^a$ and stem 37$^a$ sliding in the bore 24$^a$ and bearing 38, respectively, provide proper guides for permitting this sliding movement of the guide. It is to be noted that this form of guide is particularly adapted to constructions wherein the bores 24$^a$ and 32$^a$ are of the same diameter.

While we have herein shown and described the preferred specific embodiment of our invention, we nevertheless reserve the right to make such other changes or modifications in structure which may properly come within the scope of the appended claim.

Having described a preferred form of our invention, we claim:

In a valve, a cage and a seat with a fluid passage through the seat, a loose valve adapted to seat on the seat and to move bodily off the seat in a direction axial of the fluid passage, and an axially movable guide and carrier for the valve slidable in the fluid passage, said guide and carrier having a part that normally and substantially closes the passage when the valve is on the seat, so that fluid pressure in the passage under the guide and carrier will press upon the guide and carrier to raise it to a point where its said part is out of the fluid passage, and to raise the valve off the seat.

In witness that we claim the foregoing we have hereunto subscribed our names this 11 day of March, 1922.

R. W. GUNN.
WILLSIE A. S. THOMPSON.